US010688940B2

(12) United States Patent
Settelmayer et al.

(10) Patent No.: US 10,688,940 B2
(45) Date of Patent: Jun. 23, 2020

(54) LOAD CARRIER WITH TILTING HUB

(71) Applicant: Thule Sweden AB, Hillerstorp (SE)

(72) Inventors: Joseph Settelmayer, McKinleyville, CA (US); Oronde Armstrong, Hamden, CT (US); George Wallace Rodrigues Malheiros, Madison, CT (US)

(73) Assignee: Thule Sweden AB, Hillerstorp (SE)

(*) Notice: Subject to any disclaimer, the term of this patent is extended or adjusted under 35 U.S.C. 154(b) by 50 days.

(21) Appl. No.: 16/131,980

(22) Filed: Sep. 14, 2018

(65) Prior Publication Data
US 2020/0086803 A1 Mar. 19, 2020

(51) Int. Cl.
B60R 9/10 (2006.01)
B60R 9/06 (2006.01)

(52) U.S. Cl.
CPC . B60R 9/10 (2013.01); B60R 9/06 (2013.01)

(58) Field of Classification Search
CPC .......... B60R 9/06; B60R 9/10; Y10S 224/024
See application file for complete search history.

(56) References Cited

U.S. PATENT DOCUMENTS

| 3,355,028 | A | 11/1967 | Mork |
| 3,529,737 | A | 9/1970 | Daugherty |
| 3,843,001 | A | 10/1974 | Willis |
| 3,861,533 | A | 1/1975 | Radek |
| 4,524,893 | A | 6/1985 | Cole |
| 4,852,779 | A | 8/1989 | Berg |
| 5,579,972 | A * | 12/1996 | Despain .............. B60R 9/10 224/506 |
| 5,833,074 | A | 11/1998 | Phillips |
| 5,875,947 | A * | 3/1999 | Noel .............. B60R 9/048 211/17 |
| 6,053,336 | A | 4/2000 | Reeves |
| 6,244,483 | B1 | 6/2001 | McLemore et al. |
| 6,422,443 | B1 * | 7/2002 | Erickson .............. B60R 9/06 224/492 |
| 7,044,347 | B1 | 5/2006 | Pedrini |

(Continued)

FOREIGN PATENT DOCUMENTS

| JP | 2012035788 A | 2/2012 |
| WO | WO 03008236 A1 | 1/2003 |
| WO | 2018011661 A1 | 1/2018 |

OTHER PUBLICATIONS

Feature-packed Gen 2 pivot system, published by Recon Rack Co. Inc., Oct. 14, 2017. Retrieved Sep. 7, 2018, 8 pages. http://recon-racks.com/.

(Continued)

Primary Examiner — Brian D Nash
(74) Attorney, Agent, or Firm — Sterne, Kessler, Goldstein & Fox P.L.L.C.

(57) ABSTRACT

A vehicle mounted load carrier includes a base and a load arm. The base includes a tube and a hub. The tube defines an interior surface, and a first tube aperture extends radially through the tube. The hub is disposed at least partially within the interior surface of the tube. The hub includes a first hub aperture extending radially within the hub, and a locking mechanism configured to lock a relative rotation between the hub and the tube. The load arm is coupled to the hub.

21 Claims, 12 Drawing Sheets

(56) References Cited

U.S. PATENT DOCUMENTS

| | | | |
|---|---|---|---|
| 7,055,725 B1 * | 6/2006 | Kolda | B60R 9/06 224/497 |
| 7,694,830 B1 | 4/2010 | Larson | |
| D622,208 S * | 8/2010 | Sautter | D12/408 |
| 7,810,685 B2 * | 10/2010 | Bove | B60R 9/10 211/19 |
| 8,028,878 B1 * | 10/2011 | Pedrini | B60R 9/06 224/495 |
| 8,573,456 B2 * | 11/2013 | Farber | B60R 9/10 224/314 |
| 8,602,279 B2 | 12/2013 | Sautter et al. | |
| 9,776,575 B1 * | 10/2017 | Liu | B60R 9/06 |
| 2002/0125279 A1 | 9/2002 | Edgerly et al. | |
| 2003/0071097 A1 | 4/2003 | Dean | |
| 2003/0132259 A1 | 7/2003 | McLemore et al. | |
| 2003/0209582 A1 | 11/2003 | Reeves | |
| 2004/0238582 A1 | 12/2004 | Pedrini | |
| 2006/0032880 A1 * | 2/2006 | Settelmayer | B60R 9/10 224/497 |
| 2006/0138186 A1 * | 6/2006 | Pedrini | B60R 9/06 224/497 |
| 2006/0273126 A1 | 12/2006 | Pedrini | |
| 2007/0057001 A1 * | 3/2007 | Wang | B60R 9/06 224/536 |
| 2007/0069534 A1 | 3/2007 | Morrill et al. | |
| 2007/0164065 A1 | 7/2007 | Davis | |
| 2008/0099522 A1 | 5/2008 | Clausen et al. | |
| 2008/0164292 A1 | 7/2008 | Farney | |
| 2009/0120982 A1 * | 5/2009 | Sautter | B60R 9/08 224/323 |
| 2009/0120984 A1 | 5/2009 | Sautter et al. | |
| 2011/0240700 A1 | 10/2011 | Williams | |
| 2012/0000952 A1 * | 1/2012 | Dreger | B60R 9/10 224/533 |
| 2013/0015615 A1 * | 1/2013 | Bogoslofski | B60R 9/10 267/141.2 |
| 2014/0239027 A1 * | 8/2014 | Dickinson | B60R 9/06 224/534 |
| 2014/0246467 A1 | 9/2014 | Hein et al. | |
| 2015/0076200 A1 | 3/2015 | Pedrini | |
| 2015/0197204 A1 | 7/2015 | Shen | |
| 2016/0288726 A1 * | 10/2016 | Endrasik | B60R 9/06 |
| 2016/0355140 A1 * | 12/2016 | Condon | B60R 9/06 |
| 2018/0050645 A1 | 2/2018 | Phillips | |
| 2018/0290600 A1 * | 10/2018 | Presley | B60R 9/06 |
| 2019/0217787 A1 * | 7/2019 | Kruse | B60R 9/06 |

OTHER PUBLICATIONS

International Search Report and Written Opinion for International Application No. PCT/IB2019/054999, European Patent Office, Rijswijk, dated Oct. 7, 2019, 8 pages.

* cited by examiner

LOAD CARRIER WITH TILTING HUB

BACKGROUND

Field

The present disclosure relates to load carriers. More specifically, embodiments of the present disclosure relate to vehicle mounted load carriers, for example, bicycle carriers, with a rotatable load arm.

Background

Devices for carrying equipment on a vehicle can be used to transport the equipment from one place to another. In some examples, the load carrier can be secured to the vehicle safely and conveniently via a hitch, typically attached to the rear of the vehicle. Load carriers attached to the rear of the vehicle can block access to trunks or rear vehicle doors. In some examples, the load carrier can include a rotatable load arm to avoid blocking access to the vehicle. Various mechanisms, for example, external hinges or shafts, can help rotate the load arm. These mechanisms, however, can be weak, prone to failure, costly, heavy, or inconvenient to use for some applications.

BRIEF SUMMARY

In some embodiments, a load carrier includes a base and a load arm. In some embodiments, the load carrier is a vehicle mounted load carrier. In some embodiments, the base includes a tube defining an interior surface, and a first tube aperture extending radially through the tube. In some embodiments, the tube has a through hole defining the interior surface. In some embodiments, the base includes a hub disposed at least partially within the interior surface of the tube. In some embodiments, the hub includes a first hub aperture extending radially within the hub, and a locking mechanism configured to lock a relative rotation between the hub and the tube. In some embodiments, the first hub aperture extends radially through the hub. In some embodiments, the locking mechanism is disposed in an interior of the hub. In some embodiments, the load arm is coupled to the hub. In some embodiments, the load arm has a proximal end coupled to the hub.

In some embodiments, the locking mechanism extends through the first hub aperture and the first tube aperture in a first locked configuration. In some embodiments, the tube further includes a second tube aperture extending radially through the tube. In some embodiments, the locking mechanism extends through the second tube aperture in a second locked configuration. In some embodiments, the tube further includes a third tube aperture. In some embodiments, the locking mechanism extends through the first tube aperture and the third tube aperture in the first locked configuration. In some embodiments, the third tube aperture is disposed opposite the first aperture. In some embodiments, the locking mechanism contacts the interior surface of the tube during rotation of the hub in an unlocked configuration.

In some embodiments, the locking mechanism comprises a plate. In some embodiments, the locking mechanism is spring-loaded and biased to extend through the first tube aperture and the first hub aperture. In some embodiments, the hub includes a plurality of splines disposed along an exterior surface of the hub. In some embodiments, a first aperture in a proximal end of the load arm is splined and configured to couple around the exterior surface of the hub.

In some embodiments, a second aperture in the proximal end of the load arm is splined and configured to couple around the exterior surface of the hub.

In some embodiments, the load carrier further includes a bushing disposed radially between the tube and the hub. In some embodiments, the load arm is a platform configured to carry one or more bicycles. In some embodiments, the base further includes a stinger configured to couple to a hitch receiver of a vehicle.

In some embodiments, a load carrier includes a base, a hub, and a load arm. In some embodiments, the load carrier is a vehicle mounted load carrier. In some embodiments, the base includes a tube defining an interior surface, a first tube aperture extending through the tube, and a second tube aperture extending through the tube. In some embodiments, the tube has a through hole defining the interior surface. In some embodiments, the first tube aperture is configured to receive a locking mechanism. In some embodiments, the second tube aperture is configured to receive the locking mechanism. In some embodiments, the hub is disposed in the tube. In some embodiments, the load arm is coupled to the hub. In some embodiments, in a storage configuration, the locking mechanism extends through the first tube aperture along a substantially transverse axis of the load carrier. In some embodiments, in a transport configuration, the locking mechanism extends through the second tube aperture along a substantially longitudinal axis of the load carrier.

In some embodiments, in a loading configuration the locking mechanism contacts the interior surface of the tube. In some embodiments, the hub is configured to rotate within the tube.

In some embodiments, a method of operating a vehicle mounted load carrier includes disengaging a locking mechanism disposed in a first aperture of a tube of a base portion of the load carrier, rotating a load arm in a first direction, and engaging the locking mechanism through a second aperture of the tube.

In some embodiments, rotating the load arm in the first direction moves a platform configured to carry one or more bicycles from a storage position to a loading position. In some embodiments, disengaging the locking mechanism includes translating the locking mechanism in a direction substantially parallel to a lengthwise direction of the load arm. In some embodiments, engaging the locking mechanism includes spring-biasing the locking mechanism through the second aperture.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
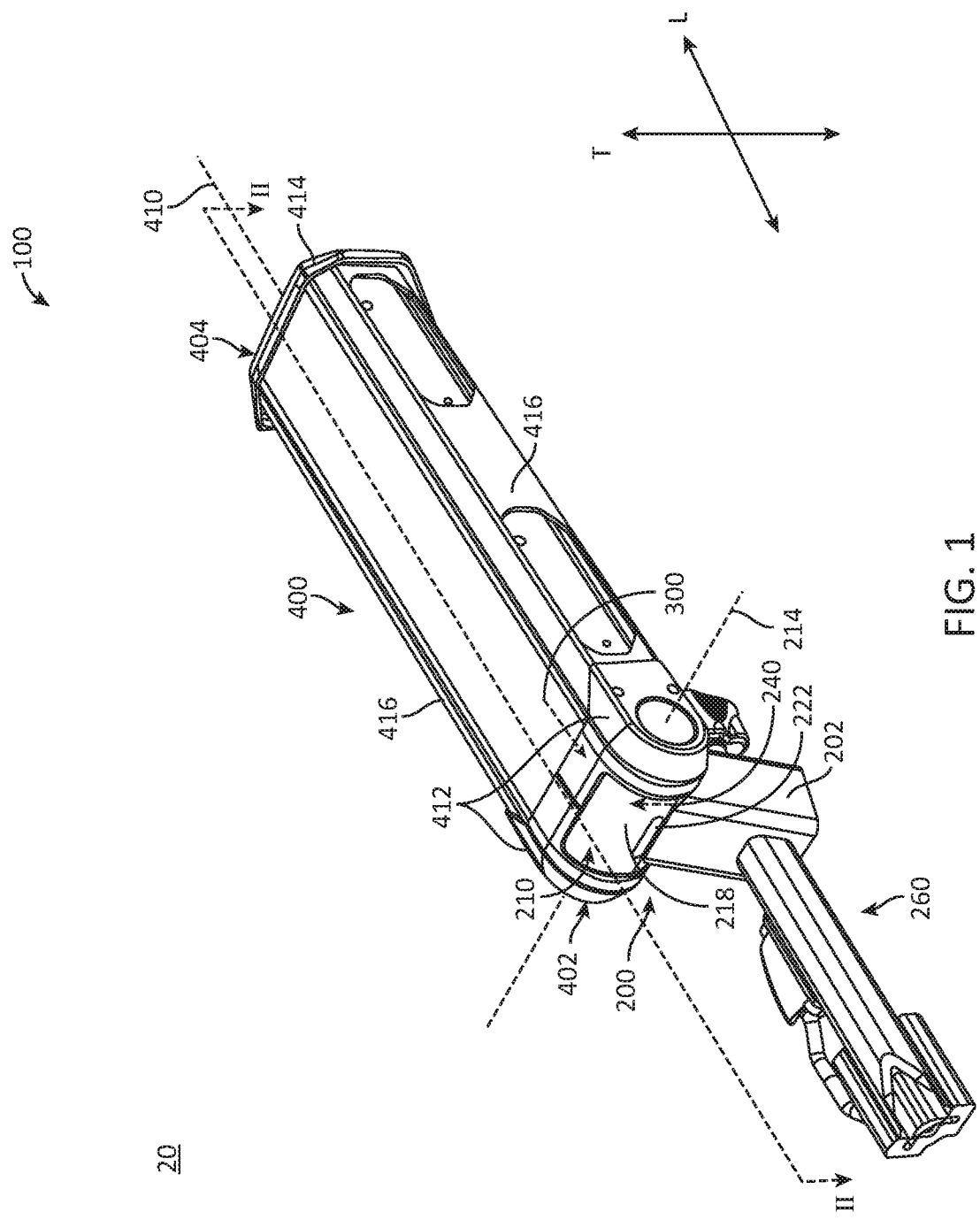
FIG. 1 illustrates a perspective view of a load carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiments of the load carrier 100 disclosed herein can be used with a load carrier system 600, for example, but not limited to, a bicycle carrier or a cargo container. More specifically, the load carrier system 600 can be a vehicle mounted bicycle carrier, for example, a hitch-mounted bicycle carrier which can be attached to a hitch receiver 500 of a vehicle. The bicycle carrier can be configured to carry one, two, three, or more bicycles.

Vehicle mounted load carriers can have a load arm for carrying equipment on a vehicle to transport the equipment from one place to another. For example, a load arm can be rotatable between storage, loading, unloading, and transporting positions. The load arm can rotate in order to avoid blocking the trunk or rear door of the vehicle, or accommodate the shape of the equipment being transported. Load carriers can have one or more rotating mechanisms to rotate the load arm. Additionally, load carriers can have one or more locking mechanisms to release, rotate, or secure the load arm at a certain position or angle. These rotating and locking mechanisms, however, can be weak, prone to failure, costly, heavy, or inconvenient to use for some applications. For example, an external hinge, lever, or shaft can be inconvenient for the user (e.g., too heavy to lift, objects caught in mechanism), causing damage to the vehicle, equipment, or objects (e.g., clothing, ropes, etc.), or creating difficulty for the user during equipment loading and unloading.

The present disclosure provides embodiments of a load carrier with a rotatable load arm internally coupled to a hub and a locking mechanism. Importantly, the arrangement and design of the rotation and locking mechanisms provide ease of use and reduce inconvenience to the user or damage to the vehicle or equipment. This allows the user to easily and conveniently release, rotate, and/or secure the load arm at a certain position or angle for loading, unloading, and/or transporting equipment.

Figure 2:
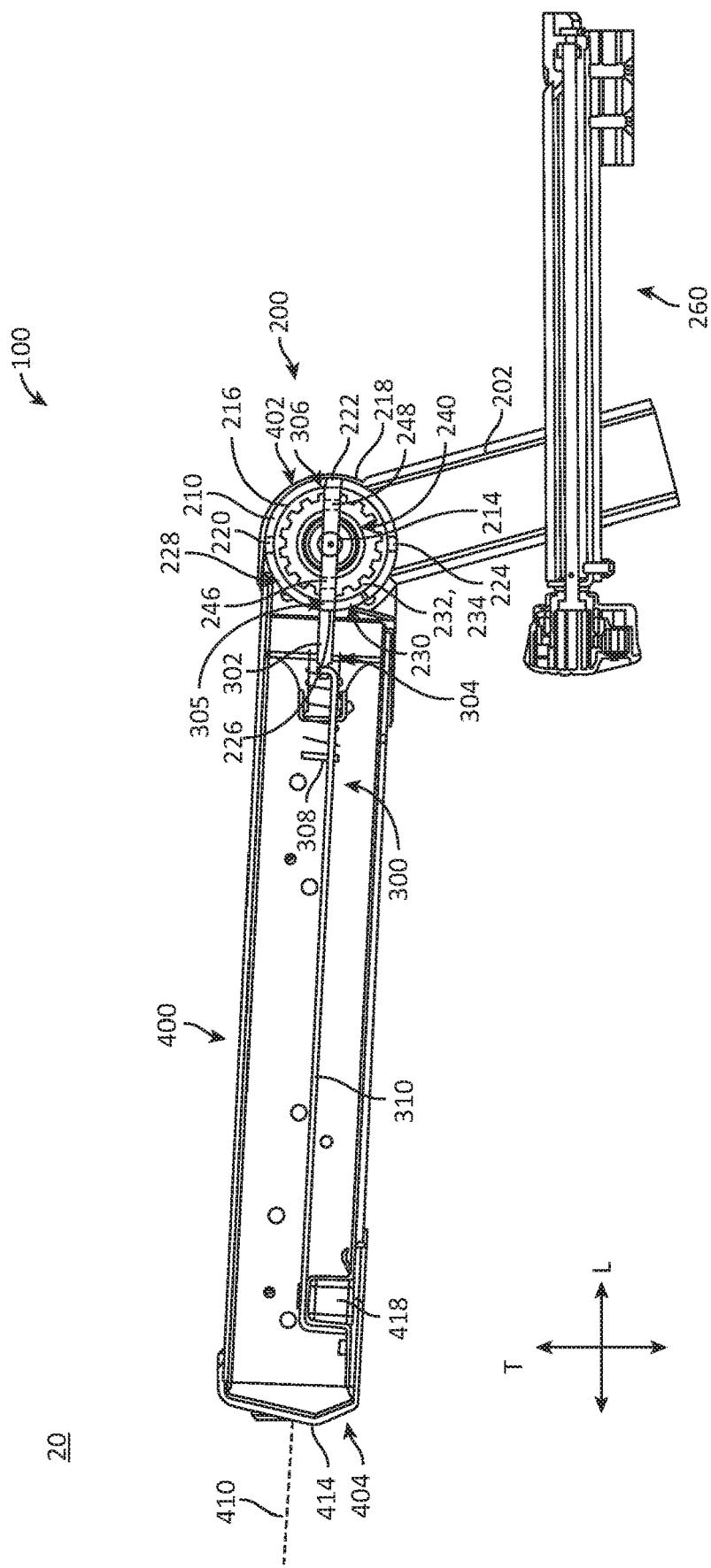
FIG. 2 illustrates a longitudinal cross-sectional view of a load carrier, according to an embodiment.
Figure 12:
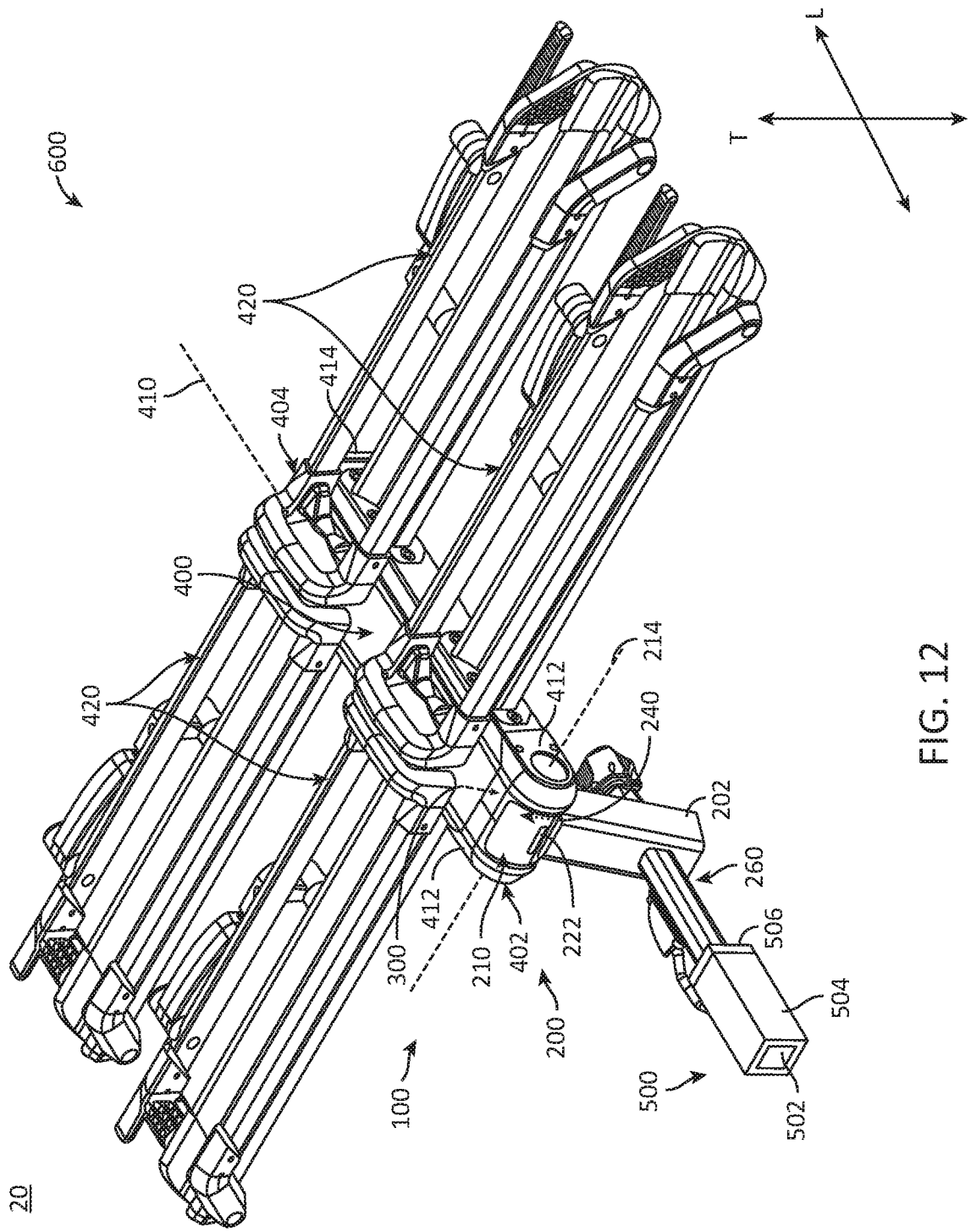
FIG. 12 illustrates a perspective view of a load carrier system, according to an embodiment.

By way of example, FIGS. 1 and 2 illustrate load carrier 100 with base 200, locking mechanism 300, and load arm 400. As shown, for example, in FIG. 12, load carrier 100 can be a vehicle mounted load carrier and can be a portion of load carrier system 600 that attaches to hitch receiver 500 (or other connection device) of a vehicle. Base 200 can include stinger 260 configured to be coupled to hitch receiver 500 of a vehicle. For example, stinger 260 can be coupled within interior surface 502 of hitch receiver 500. Generally, base 200 is a resilient material, for example, but not limited to, steel. In some embodiments, load arm 400 can include platform 420, for example, a bicycle carrier as shown in FIG. 12. In some embodiments, load carrier system 600 can be configured to carry one, two, three, or more bicycles. Other types of load carriers, such as cargo boxes or cargo platforms can be used.

Base 200 can include stem 202, tube 210, hub 240, and stinger 260. In some embodiments, as shown in FIG. 1, stem 202 can couple to tube 210 and stinger 260. In some embodiments, as shown in FIG. 12, base 200 can be secured to hitch receiver 500 via stinger 260. Hitch receiver 500 can include exterior surface 504 and interior surface 502.

FIGS. 1 and 2 illustrate load carrier 100 in unlocked configuration 20, according to embodiments. Load carrier 100 extends in a lengthwise direction along longitudinal axis (L). In some embodiments, load carrier 100 can be a vehicle mounted load carrier 100. Base 200 can be coupled to load arm 400 via tube 210 and hub 240. Tube 210 can include interior surface 216 and exterior surface 218. In some embodiments, tube 210 can include through hole 212. For example, through hole 212 can define interior surface 216 and can be aligned along longitudinal axis 214 of tube 210. In some embodiments, tube 210 can be two or more elements. For example, tube 210 can be two or more rings, cylinders, or shells coupled together, for example, clamped, bolted, or welded, to form tube 210. Hub 240 can be disposed at least partially within interior surface 216 and be configured to rotate within tube 210. In some embodiments, hub 240 can be disposed entirely within interior surface 216 of tube 210.

In some embodiments, as shown in FIG. 2, tube 210 can include first tube aperture 220, second tube aperture 222, third tube aperture 224, and/or fourth tube aperture 226 extending radially between interior surface 216 and exterior surface 218. Apertures 220, 222, 224, 226 can be configured to receive locking mechanism 300 to secure or lock hub 240 and load arm 400 at a certain position or rotation angle. In some embodiments, locking mechanism 300 can be configured to lock a relative rotation between hub 240 and tube 210. In some embodiments, as shown in FIG. 2, apertures 220, 222, 224, 226 can be arranged symmetrically about longitudinal axis 214 of tube 210. In some embodiments, apertures 220, 222, 224, 226 are spaced 90 degrees apart. In some embodiments, apertures 220, 222, 224, 226 can each be a slot or a hole.

Figure 3:
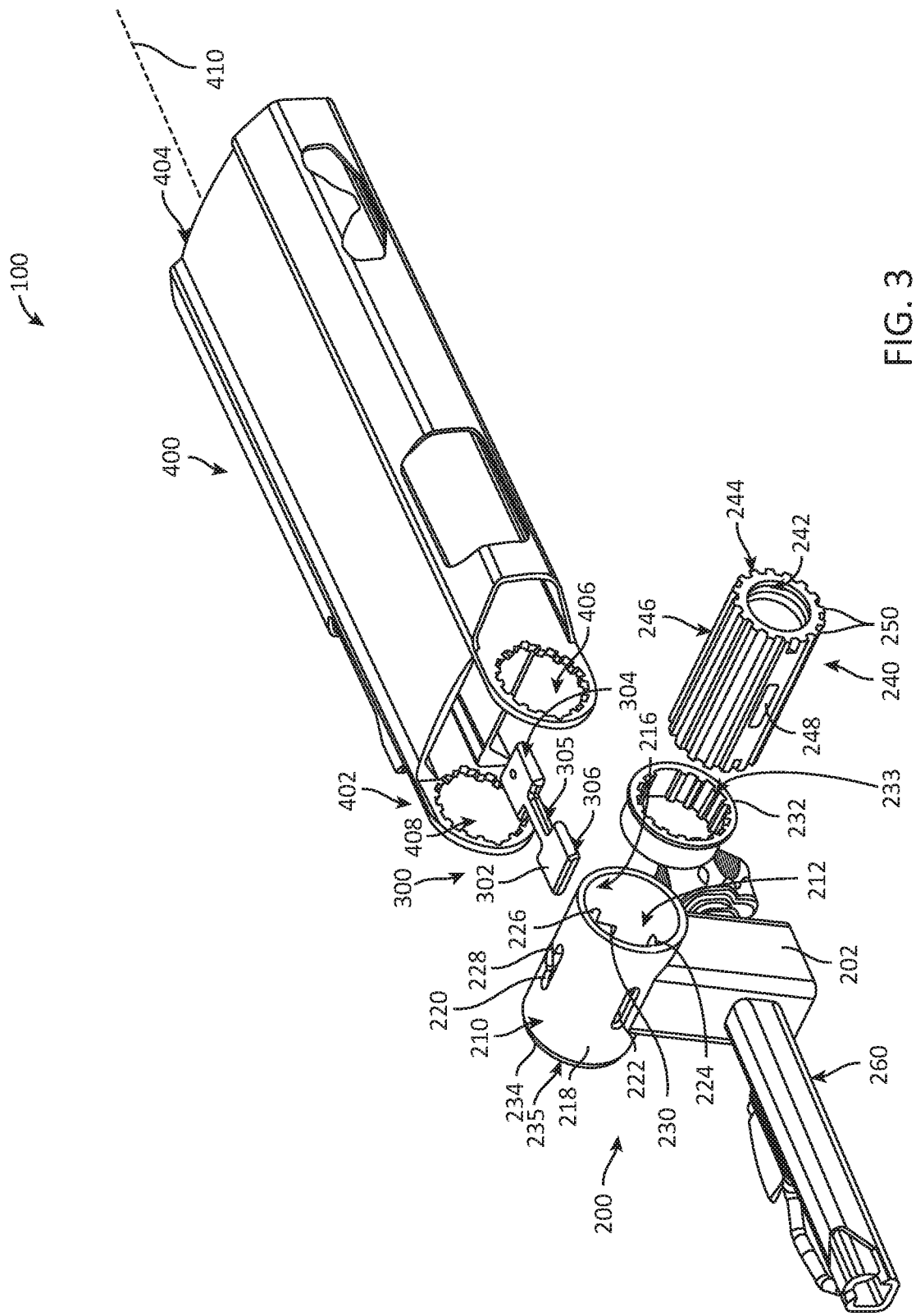
FIG. 3 illustrates a perspective exploded view of elements of a load carrier, according to an embodiment.

FIG. 3 illustrates an exploded view of elements of load carrier 100, according to an embodiment. In some embodiments, as shown in FIGS. 3-6, apertures 220, 222, 224, 226 can be rectangular with curved ends ("pill shaped") in order to form an interference fit with locking mechanism 300. An interference fit is, for example, a fastening between two parts by friction after the two parts are joined, connected, pressed, or pushed together. For example, locking mechanism 300 can be a male connector (e.g., plate, plug, rod) having a similar or matching cross-sectional shape compared to apertures 220, 222, 224, 226 (i.e., female connector). Locking mechanism 300 can be inserted into apertures 220, 222, 224, 226 and secured by friction between inserted locking mechanism 300 and apertures 220, 222, 224, 226 to form an interference fit. In some embodiments, tube 210 can include first tube channel 228. For example, as shown in FIGS. 3 and 5, first tube channel 228 can extend through tube 210 about longitudinal axis 214 for a radial distance between first tube aperture 220 and fourth tube aperture 226. In some embodiments, at least a portion of locking mechanism 300 can rotate between first tube aperture 220 and fourth tube aperture 226 via first tube channel 228. In some embodiments, tube 210 can include second tube channel 230. For example, as shown in FIGS. 3 and 5, second tube channel 230 can extend through tube 210 about longitudinal axis 214 for a radial distance between fourth tube aperture 226 and third tube aperture 224. In some embodiments, at least a portion of locking mechanism 300 can rotate between fourth tube aperture 226 and third tube aperture 224 via second tube channel 230.

As shown in FIGS. 2 and 3, for example, hub 240 includes interior surface 242, exterior surface 244, first hub aperture 246, and second hub aperture 248. Generally, hub 240 is a resilient material, for example, but not limited to, steel. Hub 240 can be cylindrical and configured to extend beyond interior surface 216 of tube 210 in order to couple to load arm 400. First hub aperture 246 and second hub aperture 248 extend radially within hub 240. In some embodiments, first and second hub apertures 246, 248 can extend radially through hub 240. For example, first and second hub apertures 246, 248 can extend all the way through hub 240. In some embodiments, first hub aperture 246 and second hub aperture 248 can be arranged symmetrically about a longitudinal axis of hub 240. For example, first hub aperture 246 can be disposed opposite second hub aperture 248. In some embodiments, apertures 246, 248 can each be a slot or a hole. In some embodiments, as shown in FIG. 2, locking mechanism 300 can be disposed within interior surface 242 of hub 240 and extend through first hub aperture 246 and second hub aperture 248. In some embodiments, locking mechanism 300 can be partially connected to hub 240. In some embodiments, as shown in FIG. 3, first hub aperture 246 and second hub aperture 248 can be rectangular with curved ends ("pill shaped") in order to form an interference fit with locking mechanism 300. In some embodiments, as shown in FIGS. 2 and 3, hub 240 can include a plurality of splines 250 disposed on exterior surface 244. Splines are, for example, ridges or teeth on a cylinder or shaft which can mesh or contact corresponding grooves in a mating piece in order to transfer torque between the two parts. For example, the plurality of splines 250 or teeth can be disposed around exterior surface 244 of hub 240 and can extend radially outward (i.e., male spline). In some embodiments, the splines 250 can be disposed symmetrically around exterior surface 244 of hub 240. In some embodiments, the plurality of splines 250 can mesh or contact first and second splined apertures 406, 408 (i.e., female spline) of proximal end 402 of load arm 400 in order to form a splined joint.

In some embodiments, as shown in FIGS. 2 and 3, base 200 can further include first bushing 232 and second bushing 234 disposed radially between tube 210 and hub 240. In some embodiments, first bushing 232 and second bushing 234 can be a single bushing. First bushing 232 and second bushing 234 can reduce friction between interior surface 216 of tube 210 and hub 240 as hub 240 rotates about longitudinal axis 214. Generally, first and second bushings 232, 234 are a resilient and smooth material, for example, but not limited to, polymers or metals. In some embodiments, as shown in FIG. 2, first and second bushings 232, 234 can function as end caps and couple to distal ends of hub 240 and tube 210. In some embodiments, as shown in FIGS. 2 and 3, first and second bushings 232, 234 can include a plurality of splines 233, 235, respectively, on an interior surface in order to form a splined connection with the plurality of splines 250 of hub 240.

As shown in FIGS. 1 and 3, load arm 400 includes proximal end 402 and distal end 404. Load arm 400 can be used to support various types of equipment or attachments. Load arm 400 can be rotatably coupled to base 200 via hub 240 and tube 210. For example, proximal end 402 can be rotatably coupled to hub 240. In some embodiments, the plurality of splines 250 (i.e., male spline) of hub 240 can couple (e.g., mesh or contact) with first and second splined apertures 406, 408 (i.e., female spline) of proximal end 402 of load arm 400 in order to form a splined joint and allow for rotation of both load arm 400 and hub 240. In some embodiments, load arm 400 can be a rectangular cuboid with curved edges. Load arm 400 can extend along a lengthwise direction 410. As shown in FIG. 1, lengthwise direction 410 is orthogonal to longitudinal axis 214 of tube 210. Generally, load arm 400 is a resilient material, for example, but not limited to, steel. In some embodiments, as shown in FIG. 1, load arm 400 can include proximal cover 412, distal cover 414, and side covers 416.

In some embodiments, as shown in FIG. 3, proximal end 402 can include first aperture 406 and second aperture 408. For example, first and second apertures 406, 408 can each be splined on an interior surface in order to form a splined connection with the plurality of splines 250 of hub 240. In some embodiments, hub 240 can form a first splined connection with first and second bushings 232, 234 and a second splined connection with first and second apertures 406, 408 of proximal end 402. In some embodiments, as shown in FIG. 1, load arm 400 can be internally coupled to hub 240 and locking mechanism 300, and externally protected by proximal cover 412, distal cover 414, and/or side covers 416. For example, proximal cover 412 can prevent internal access to hub 240 and first and second apertures 406, 408 of proximal end 402, which reduces inconvenience to a user or damage to a vehicle or equipment, and improves ease for the user to release, rotate, or secure load arm 400 at a certain position or angle.

Figure 4:
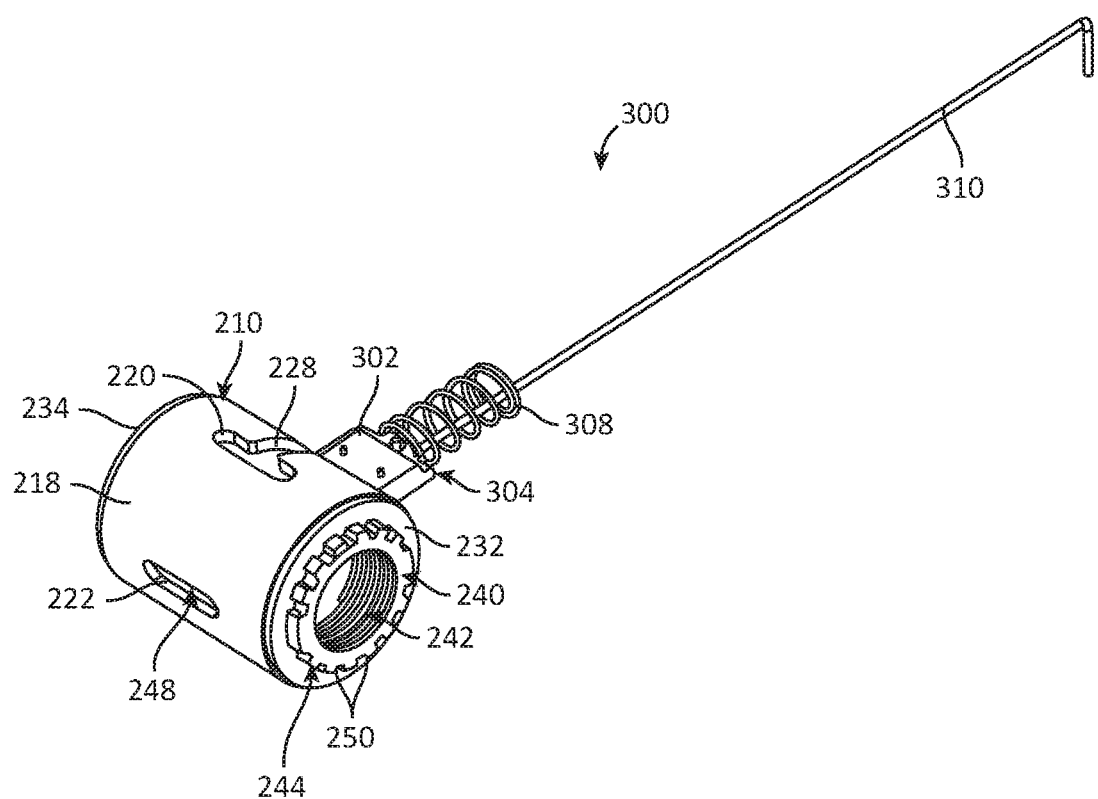
FIG. 4 illustrates a perspective view of elements of a load carrier, according to an embodiment.
Figure 5:
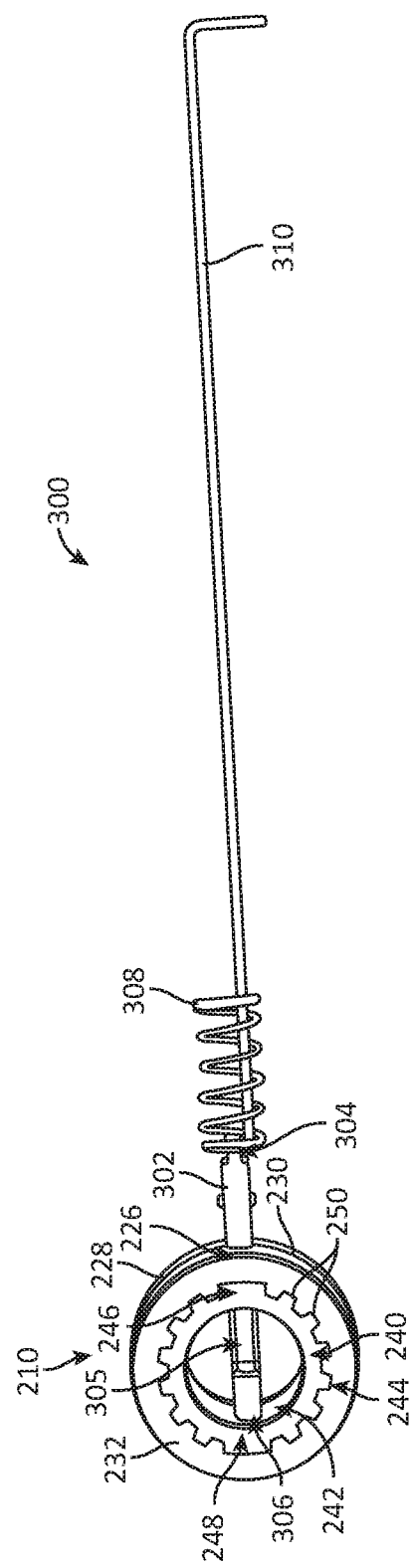
FIG. 5 illustrates a side perspective view of elements of a load carrier, according to an embodiment.
Figure 6:
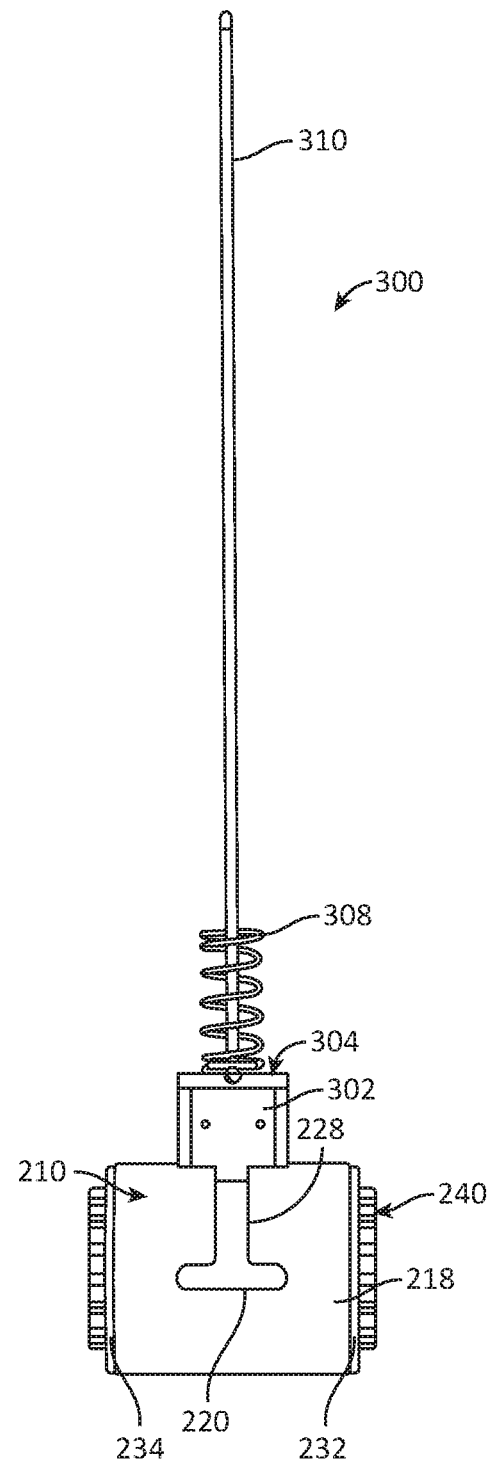
FIG. 6 illustrates a top view of elements of a load carrier, according to an embodiment.

FIGS. 4-6 illustrate elements of load carrier 100, according to embodiments. Locking mechanism 300 can be configured to lock a relative rotation between hub 240 and tube 210. In some embodiments, locking mechanism 300 can couple and extend through tube 210 and hub 240 to form an interference fit. For example, as shown in FIGS. 4 and 5, locking mechanism 300 can extend through fourth tube aperture 226 and first hub aperture 246 in order to rotationally secure (i.e., link) hub 240 to tube 210. In some embodiments, locking mechanism 300 and first hub aperture 246 rotate together about longitudinal axis 214 of tube 210. For example, in unlocked configurations 20, 30 (FIGS. 2 and 10), hub 240 can rotate with locking mechanism 300 about longitudinal axis 214 for a plurality of rotation angles. For example, hub 240 and locking mechanism 300 can rotate together between second tube channel 230, fourth tube aperture 226, first tube channel 228, and first tube aperture 220. In some embodiments, locking mechanism 300 can couple to tube 210, first and second bushings 232, 234, and hub 240. For example, as shown in FIG. 6, first and second bushings 232, 234 can be arranged symmetrically in tube 210 about locking mechanism 300.

Figure 9:
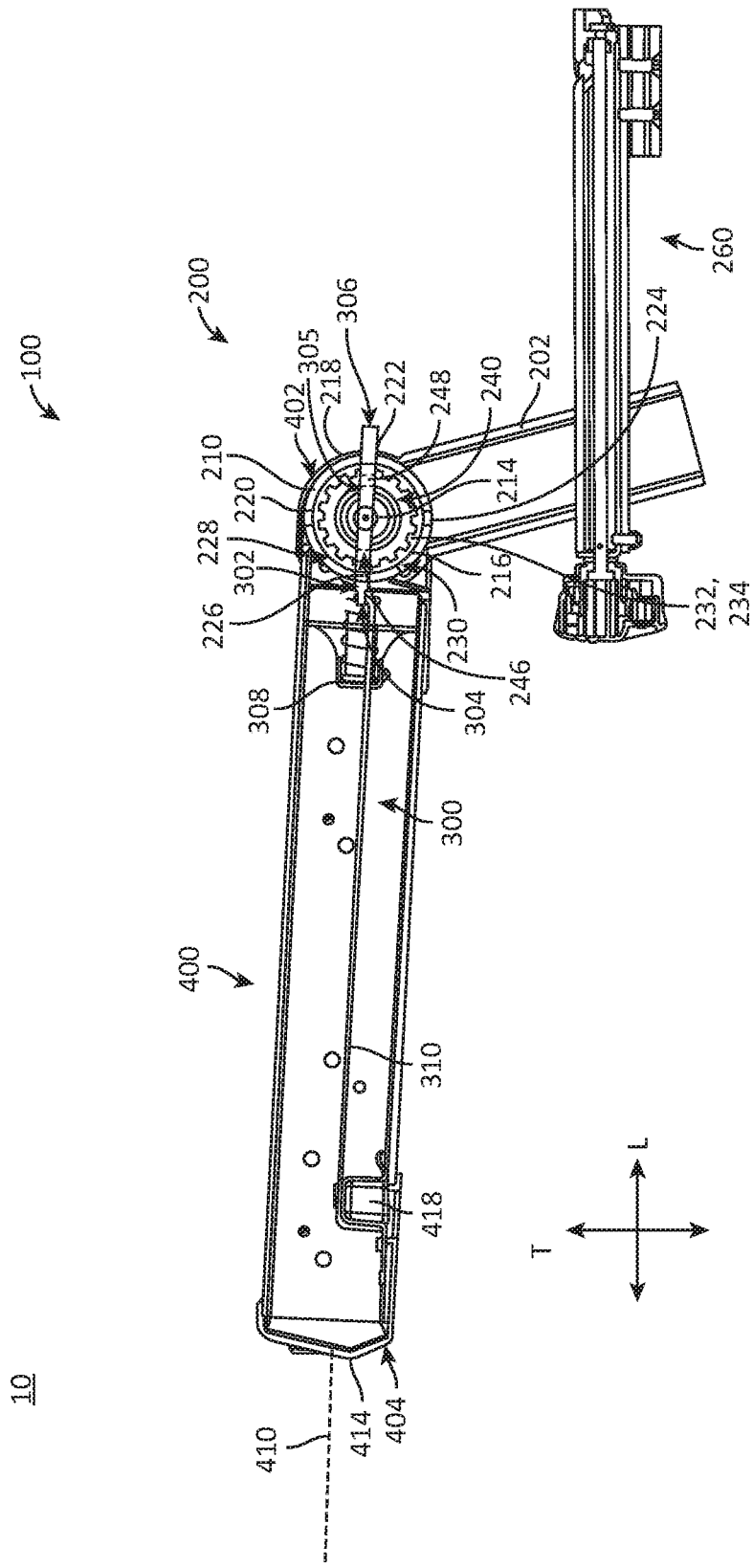
FIG. 9 illustrates a longitudinal cross-sectional view of a load carrier, according to an embodiment.
Figure 10:
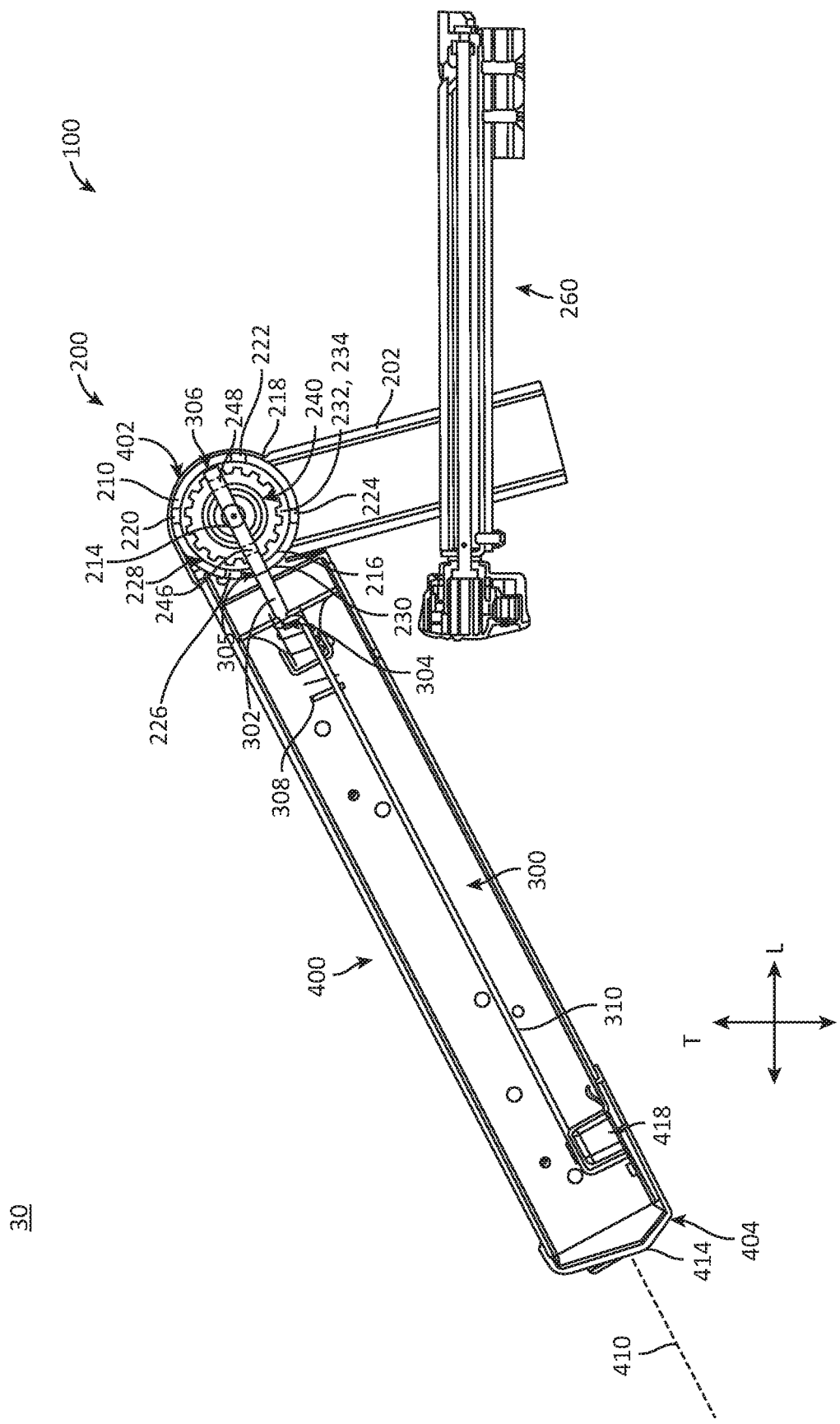
FIG. 10 illustrates a longitudinal cross-sectional view of a load carrier, according to an embodiment.
Figure 11:
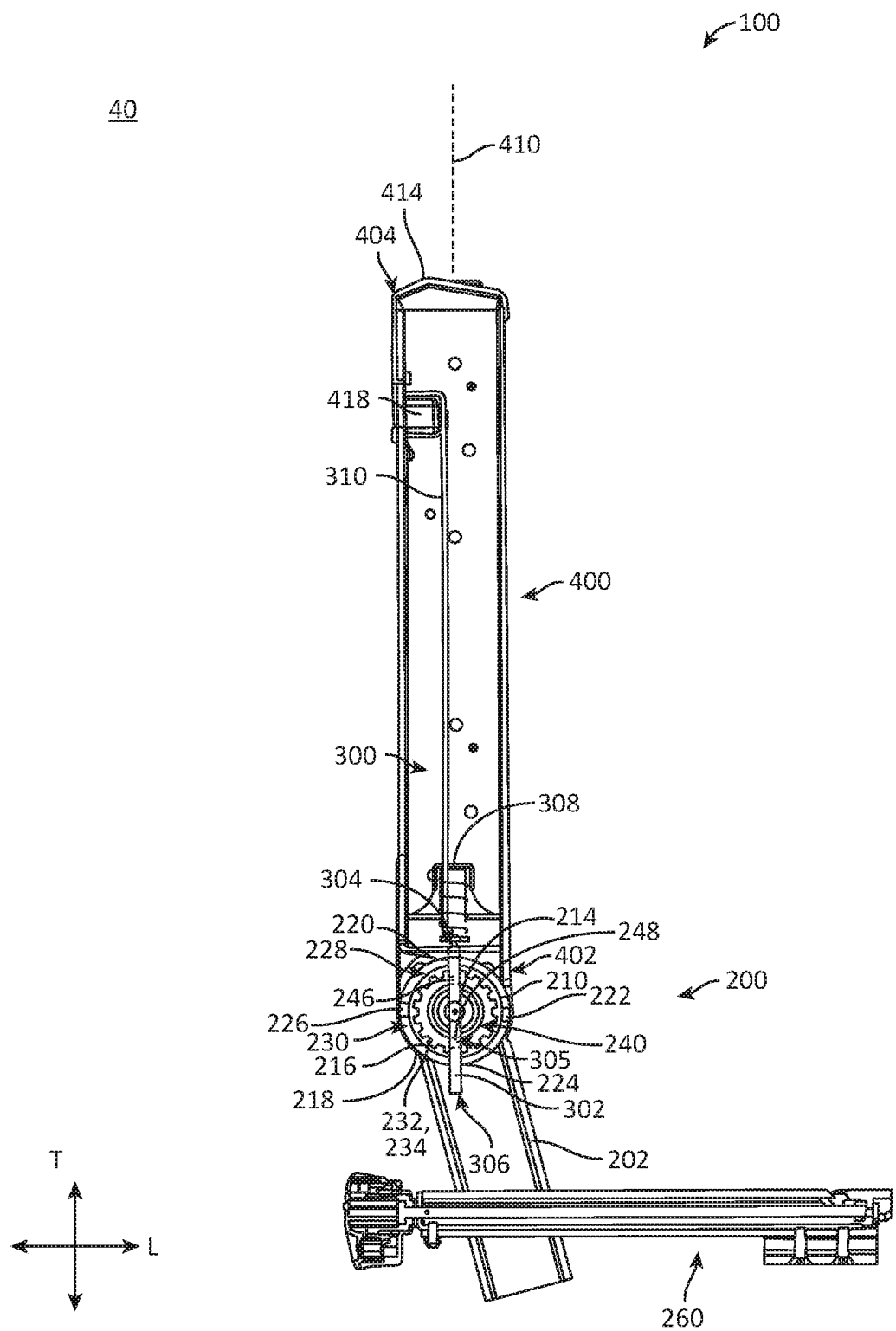
FIG. 11 illustrates a longitudinal cross-sectional view of a load carrier, according to an embodiment.

As shown in FIG. 2, load arm 400 can include handle 418, for example, disposed at or near distal end 404. Handle 418 can be coupled to locking mechanism 300 in order to engage or disengage locking mechanism 300 disposed in interior surface 242 of hub 240. In some embodiments, as shown in FIGS. 9 and 11, locking mechanism 300 is engaged (i.e., locked) when locking mechanism 300 extends through second tube aperture 222 or third tube aperture 224. In some embodiments, as shown in FIGS. 2 and 10, locking mechanism 300 is disengaged (i.e., unlocked) when locking mechanism 300 retracts through second tube aperture 222 or third tube aperture 224. In some embodiments, locking mechanism 300 is disengaged (i.e., unlocked) when locking mechanism 300 extends through fourth tube aperture 226, first tube aperture 220, first tube channel 228, or second tube channel 230, but does not extend through second tube aperture 222 or third tube aperture 224. In some embodiments, as shown in FIG. 2, handle 418 can be translated along lengthwise direction 410 toward distal end 404 to disengage locking mechanism 300. For example, in unlocked configuration 20, locking mechanism 300 is disengaged after handle 418 is translated. In some embodiments, as shown in FIG. 9, handle 418 can be translated along lengthwise direction 410 toward proximal end 402 to engage locking mechanism 300. For example, in locked configuration 10, locking mechanism 300 is engaged after handle 418 is translated.

Figure 7:
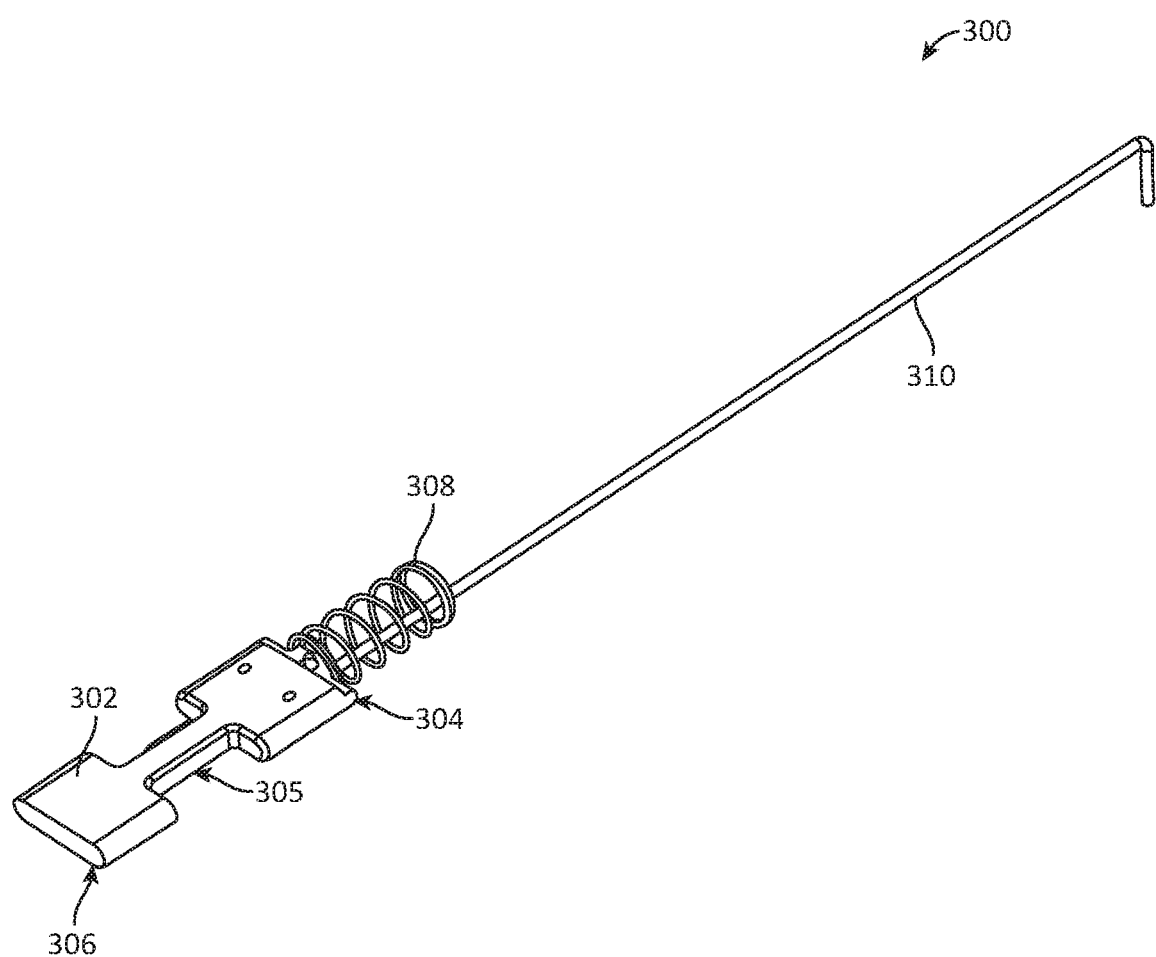
FIG. 7 illustrates a perspective view of a locking mechanism for a load carrier, according to an embodiment.

FIG. 7 illustrates locking mechanism 300 for load carrier 100, according to an embodiment. As shown in FIGS. 2 and 7, locking mechanism 300 can include plate 302, spring 308 (or other biasing element), and actuator 310. In some embodiments, plate 302 can include distal end 304, proximal end 306, and central section 305 disposed between distal end 304 and proximal end 306. For example, as shown in FIG. 7, central section 305 can be narrower than distal and proximal ends 304, 306, such that in a plan or top view plate 302 is I-shaped or has a symmetrically recessed central section 305. In some embodiments, as shown in FIGS. 5 and 10, central section 305 can extend through tube 210 and hub 240 such that locking mechanism 300 can rotate between second tube channel 230, fourth tube aperture 226, first tube channel 228, and first tube aperture 220. For example, central section 305 can match or have a similar width with first tube channel 228 and/or second tube channel 230. Generally, plate 302 is a resilient material, for example, but not limited to, polymers or metals. In some embodiments, spring 308 can be any element or structure capable of applying a restoring force to plate 302. In some embodiments, as shown in FIGS. 2 and 5, locking mechanism 300 is spring-loaded and biased to extend through, for example, fourth tube aperture 226 and first hub aperture 246. For example, spring 308 can be secured to an internal section of load arm 400 near proximal end 402 to provide a fixed and rigid element upon which spring 308 can be compressed. In some embodiments, as shown in FIG. 7, actuator 310 can be a rod. In some embodiments, actuator 310 can be, for example, mechanical (e.g., coil, cable, rack and pinion, gears, rail, pulley, chain, cam, latch, spring), electrical (e.g., linear motor, twisted and coiled polymer, supercoiled polymer), magnetic (e.g., solenoid, shape memory), hydraulic, or pneumatic. In some embodiments, as shown in FIG. 2, actuator 310 can be coupled to handle 418. In some embodiments, as shown in FIG. 7, actuator 310 can be coupled to distal end 304. For example, actuator 310 can be secured to plate 302 via an interference fit. For example, actuator 310 can be integral with plate 302. For example, actuator 310 can be secured to plate 302 via a screw or bolt.

Figure 8:
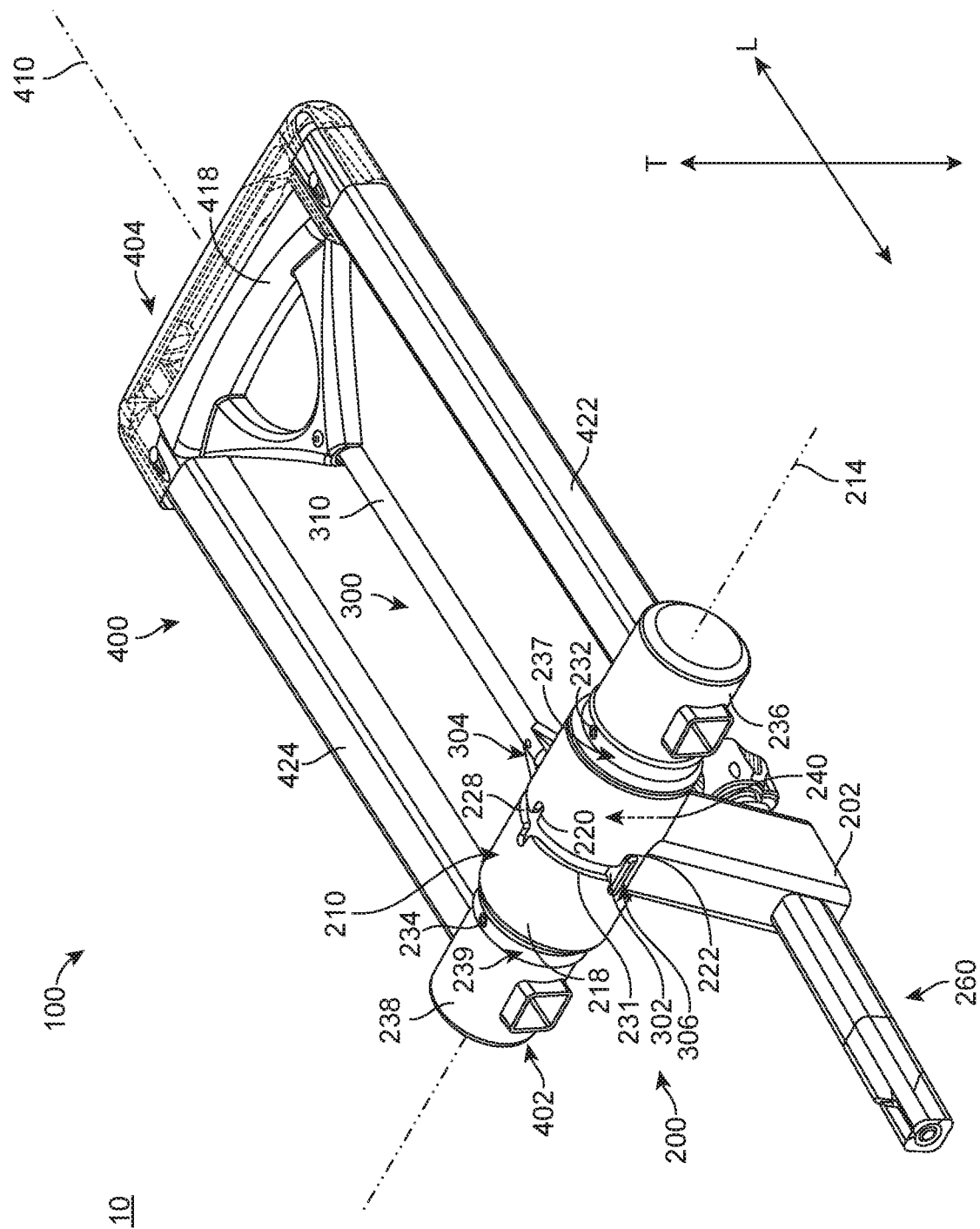
FIG. 8 illustrates a perspective view of a load carrier, according to an embodiment.

FIG. 8 illustrates load carrier 100 in locked configuration 10, according to an embodiment. Load carrier 100 of FIG. 8 is similar to load carrier 100 of FIGS. 1 and 3, except hub 240 can be coupled to load arm 400 by first hub cap 236 and second hub cap 238. As shown in FIG. 8, load arm 400 can include first load rail 422 and second load rail 424. In some embodiments, load arm 400 can be welded to hub 240. For example, as shown in FIG. 8, first and second load rails 422, 424 of load arm 400 can be welded to first and second hub caps 236, 238, respectively, rotatably coupling proximal end 402 to hub 240. In some embodiments, hub 240 can comprise first and second hub caps 236, 238. In some embodiments, load arm 400 can be bolted to hub 240. For example, as shown in FIG. 8, first and second load rails 422, 424 of load arm 400 can be connected (e.g., welded, integral, bolted, etc.) to first and second hub caps 236, 238, respectively, and first and second hub caps 236, 238 can be coupled to first and second bushings 232, 234 by first and second cap bolts 237, 239, respectively. In some embodiments, first and second bushings 232, 234 can be omitted and hub 240 can be coupled to first and second hub caps 236, 238 by first and second cap bolts 237, 239, respectively. In some embodiments, as shown in FIG. 8, tube 210 can include third tube channel 231. For example, third tube channel 231 can extend between first tube aperture 220 and second tube aperture 222 such that locking mechanism 300 can rotate between first and second tube apertures 220, 222.

FIG. 9 illustrates load carrier 100 in locked configuration 10, according to an embodiment. In some embodiments, locked configuration 10 can be a transport configuration, where for example, load carrier 100 can transport one or more bicycles in locked configuration 10. Proximal end 306 of plate 302 can extend through second tube aperture 222, as well as fourth tube aperture 226, and first and second hub apertures 246, 248. For example, in locked configuration 10 locking mechanism 300 can extend through second tube aperture 222. Handle 418 can be linearly translated, for example, by the biasing force of spring 308, along lengthwise direction 410 toward proximal end 402 of load arm 400 to extend locking mechanism 300, including plate 302, through second tube aperture 222 to locked configuration 10. In some embodiments, locked configuration 10 can be a loading configuration, where a load (e.g., bicycles) can be disposed onto load arm 400. In some embodiments, as shown in FIG. 9, locked configuration 10 can secure load arm 400 in a locked (fixed) position and angle with respect to longitudinal axis L. For example, load arm 400 can be fixed at an angle of about: 0 degrees, 10 degrees, 20 degrees, 30 degrees, 40 degrees, 50 degrees, 60 degrees, 70 degrees, 80 degrees, or 90 degrees with respect to longitudinal axis L. For example, lengthwise direction 410 of load arm 400 can extend substantially along longitudinal axis L in locked configuration 10. For example, load arm 400 can be fixed at an angle of about: −10 degrees, −20 degrees, −30 degrees, −40 degrees, or −50 degrees with respect to longitudinal axis L. In some embodiments, as shown in FIG. 9, locked configuration 10 can prevent rotation of load arm 400 about longitudinal axis 214 of tube 210 via hub 240.

FIG. 2 illustrates load carrier 100 in unlocked configuration 20, according to an embodiment. In some embodiments, unlocked configuration 20 can be a loading configuration. For example, one or more loads (e.g., bicycles) can be loaded onto load arm 400 of load carrier 100 in unlocked configuration 20. In some embodiments, unlocked configuration 20 can be an unloading configuration. For example, one or more loads (e.g., bicycles) can be unloaded from load arm 400 of load carrier 100 in unlocked configuration 20. Proximal end 306 of plate 302 can extend through fourth tube aperture 226 and first and second hub apertures 246, 248. As shown in FIG. 2, plate 302 does not extend through second tube aperture 222 in unlocked configuration 20, which allows hub 240 and load arm 400 coupled to hub 240 to freely rotate. For example, in unlocked configuration 20 locking mechanism 300 can contact interior surface 216 of tube 210. Handle 418 can be linearly translated, for example, by the force of a user's hand to compress spring 308, along lengthwise direction 410 toward distal end 404 to retract locking mechanism 300, including plate 302, from second tube aperture 222 to unlocked configuration 20. As shown in FIG. 2, unlocked configuration 20 can release load arm 400 in an unlocked (unfixed) position and angle with respect to longitudinal axis L. In some embodiments, unlocked configuration 20 can allow rotation of load arm 400 about longitudinal axis 214 of tube 210 via hub 240. For example, load arm 400 can be rotated to an angle of about: 0 degrees, 10 degrees, 20 degrees, 30 degrees, 40 degrees, 50 degrees, 60 degrees, 70 degrees, 80 degrees, or 90 degrees with respect to longitudinal axis L. For example, as shown in FIG. 2, lengthwise direction 410 of load arm 400 can extend substantially along longitudinal axis L in unlocked configuration 20. For example, load arm 400 can be rotated to an angle of about: −10 degrees, −20 degrees, −30 degrees, −40 degrees, or −50 degrees with respect to longitudinal axis L. In some embodiments, load arm 400 can rotate to two or more positions and angles with respect to longitudinal axis L in unlocked configuration 20. For example, load arm 400 can be rotated to an angle of 0 degrees and 90 degrees with respect to longitudinal axis L.

FIG. 10 illustrates load carrier 100 in unlocked configuration 30, according to an embodiment. In some embodiments, unlocked configuration 30 can be a loading configuration. For example, one or more loads (e.g., bicycles) can be loaded onto load arm 400 of load carrier 100 in unlocked configuration 30. In some embodiments, unlocked configuration 30 can be an unloading configuration. For example, one or more loads (e.g., bicycles) can be unloaded from load arm 400 of load carrier 100 in unlocked configuration 30. Unlocked configuration 30 is similar to unlocked configuration 20. Proximal end 306 of plate 302 can extend through fourth tube aperture 226 and first and second hub apertures 246, 248. As shown in FIG. 10, plate 302 does not extend through second tube aperture 222 or third tube aperture 224 in unlocked configuration 30, which allows hub 240 and load arm 400 coupled to hub 240 to freely rotate. For example, in unlocked configuration 30 locking mechanism 300 can contact interior surface 216 of tube 210. Handle 418 can be linearly translated, for example, by the force of a user's hand to compress spring 308, along lengthwise direction 410 toward distal end 404 to retract locking mechanism 300, including plate 302, from second tube aperture 222 or third tube aperture 224 to unlocked configuration 30. As shown in FIG. 10, unlocked configuration 30 can release load arm 400 in an unlocked (unfixed) position and angle with respect to longitudinal axis L. In some embodiments, unlocked configuration 30 can allow rotation of load arm 400 about longitudinal axis 214 of tube 210 via hub 240. For example, load arm 400 can be rotated to an angle of about: 0 degrees, 10 degrees, 20 degrees, 30 degrees, 40 degrees, 50 degrees, 60 degrees, 70 degrees, 80 degrees, or 90 degrees with respect to longitudinal axis L. For example, load arm 400 can be rotated to an angle of about: −10 degrees, −20 degrees, −30 degrees, −40 degrees, or −50 degrees with respect to longitudinal axis L. For example, as shown in FIG. 10, lengthwise direction 410 of load arm 400 can extend substantially along an angle of about −30 degrees with respect to longitudinal axis L in unlocked configuration 30. In some embodiments, load arm 400 can rotate to two or more positions and angles with respect to longitudinal axis L in unlocked configuration 30. For example, plate 302 can extend through first tube channel 228 such that lengthwise direction 410 of load arm 400 forms an angle above longitudinal axis L in unlocked configuration 30. For example, as shown in FIG. 10, plate 302 can extend through second tube channel 230 such that lengthwise direction 410 of load arm 400 forms an angle below longitudinal axis L in unlocked configuration 30. This can facilitate loading bicycles onto the load carrier 100, since the load arm 400 is disposed closer to the ground.

FIG. 11 illustrates load carrier 100 in locked configuration 40, according to an embodiment. In some embodiments, locked configuration 40 can be a storage configuration. For example, when not loading, unloading, or transporting one or more loads (e.g., bicycles), load carrier 100 can be stored in locked configuration 40. This can dispose load carrier 100 closer to the vehicle reducing its spatial footprint when not in use. Proximal end 306 of plate 302 can extend through third tube aperture 224, as well as first tube aperture 220, and first and second hub apertures 246, 248. For example, in locked configuration 40 locking mechanism 300 can extend through third tube aperture 224. Handle 418 can be linearly translated, for example, by the biasing force of spring 308, along lengthwise direction 410 toward proximal end 402 of load arm 400 to extend locking mechanism 300, including plate 302, through third tube aperture 224 to locked configuration 40. In some embodiments, as shown in FIG. 11, locked configuration 40 can secure load arm 400 in a locked (fixed) position and angle with respect to longitudinal axis L. For example, load arm 400 can be fixed at an angle of about: 70 degrees, 80 degrees, 90 degrees, or 100 degrees with respect to longitudinal axis L. For example, lengthwise direction 410 of load arm 400 can extend substantially along transverse axis T in locked configuration 40. In some embodiments, locked configuration 40 can prevent rotation of load arm 400 about longitudinal axis 214 of tube 210 via hub 240.

In some embodiments, in locked configuration 40 (see FIG. 11), a user can disengage locking mechanism 300 disposed in third tube aperture 224. For example, the user can disengage locking mechanism 300 by linearly translating handle 418 along lengthwise direction 410 toward distal end 404 to retract locking mechanism 300, including plate 302, from third tube aperture 224 and operate in unlocked configurations 20, 30 (see FIGS. 2 and 10). In some embodiments, in unlocked configurations 20, 30 (see FIGS. 2 and 10), the user can rotate load arm 400 in a first direction. For example, the user can rotate load arm 400 between locked configuration 40 (see FIG. 11), with load arm 400 substantially aligned along transverse axis T, and unlocked configuration 20 (see FIG. 2), with load arm 400 substantially aligned along longitudinal axis L. For example, the user can rotate load arm 400 between locked configuration 40 (see FIG. 11), with load arm 400 substantially aligned along transverse axis T, and unlocked configuration 30 (see FIG. 10), with load arm 400 substantially aligned along an angle below longitudinal axis L. In some embodiments, in unlocked configurations 20, 30 (see FIGS. 2 and 10), a user can engage locking mechanism 300 through second tube aperture 222. For example, the user can engage locking mechanism 300 by linearly translating handle 418 along lengthwise direction 410 toward proximal end 402 to extend locking mechanism 300, including plate 302, through second tube aperture 222 in locked configuration 10 (see FIG. 9).

In some embodiments, in locked configuration 10 (see FIG. 9), a user can disengage locking mechanism 300 disposed in second tube aperture 222. For example, the user can disengage locking mechanism 300 by linearly translating handle 418 along lengthwise direction 410 toward distal end 404 to retract locking mechanism 300, including plate 302, from second tube aperture 222 and operate in unlocked configurations 20, 30 (see FIGS. 2 and 10). In some embodiments, in unlocked configurations 20, 30 (see FIGS. 2 and 10), the user can rotate load arm 400 in a second direction. For example, the user can rotate load arm 400 between locked configuration 10 (see FIG. 9), with load arm 400 substantially aligned along longitudinal axis L, and unlocked configuration 20 (see FIG. 2), with load arm 400 substantially aligned along longitudinal axis L. For example, the user can rotate load arm 400 between locked configuration 10 (see FIG. 9), with load arm 400 substantially aligned along longitudinal axis L, and unlocked configuration 30 (see FIG. 10), with load arm 400 substantially aligned along an angle below longitudinal axis L. In some embodiments, in unlocked configurations 20, 30 (see FIGS. 2 and 10), a user can engage locking mechanism 300 through third tube aperture 224. For example, the user can engage locking mechanism 300 by linearly translating handle 418 along lengthwise direction 410 toward proximal end 402 to extend locking mechanism 300, including plate 302, through third tube aperture 224 in locked configuration 40 (see FIG. 11).

FIG. 12 illustrates an embodiment of load carrier system 600. As shown in FIG. 12, load carrier system 600 can include load carrier 100 and hitch receiver 500. In some embodiments, load arm 400 of load carrier 100 can include platform 420 for securing equipment. For example, platform 420 can secure one or more bicycles. As shown in FIG. 12, stinger 260 of load carrier 100 can be disposed in hitch receiver 500 such that stinger 260 contacts interior surface 502 to secure load carrier 100 to hitch receiver 500. In some embodiments, as shown in FIG. 12, load carrier system 600 is a hitch-mounted bicycle carrier. In some embodiments, stinger 260 of load carrier 100 can be inserted into hitch receiver 500 of a vehicle or load carrier system 600.

Methods of operating a load carrier can be accomplished according to the manners of operation disclosed herein. In some embodiments, as shown in FIGS. 2 and 10, load carrier 100 can be disposed in unlocked configurations 20, 30. In some embodiments, this can be accomplished, for example, by moving or translating handle 418 along lengthwise direction 410 toward distal end 404 of load arm 400 to place locking mechanism 300 in unlocked configurations 20, 30. In some embodiments, load carrier 100 can be retained in unlocked configurations 20, 30, without the user holding handle 418. In some embodiments, as shown in FIGS. 9 and 11, load carrier 100 can be disposed in locked configurations 10, 40. In some embodiments, this can be accomplished, for example, by moving or translating handle 418 along lengthwise direction 410 toward proximal end 402 to place locking mechanism 300 in locked configurations 10, 40. In some embodiments, load carrier 100 can be retained in locked configurations 10, 40, without the user holding handle 418.

In some embodiments, in storage configuration 40 (see FIG. 11), a user can disengage locking mechanism 300 disposed in third tube aperture 224. For example, the user can pull handle 418 to disengage and retract locking mechanism 300, including plate 302, from third tube aperture 224 and operate in unlocked configurations 20, 30 (see FIGS. 2 and 10). The user can then rotate load arm 400 to a loading configuration 20, 30 (see FIGS. 2 and 10). For example, the user can rotate load arm 400 to loading configuration 30 (see FIG. 10), for which load arm 400 is disposed at an angle of −30 degrees with respect to longitudinal axis L and locking mechanism 300 is disposed in second tube channel 230. The user can then load one or more loads (e.g., bicycles) onto platform 420 of load arm 400. The user can then rotate load arm 400 to transport configuration 10 (see FIG. 9) and engage locking mechanism 300 disposed in second tube aperture 222.

In some embodiments, in transport configuration 10 (see FIG. 9), a user can disengage locking mechanism 300 disposed in second tube aperture 222. For example, the user can pull handle 418 to disengage and retract locking mechanism 300, including plate 302, from second tube aperture 222 and operate in unlocked configurations 20, 30 (see FIGS. 2 and 10). The user can then rotate load arm 400 to a loading (unloading) configuration 20, 30 (see FIGS. 2 and 9). For example, the user can rotate load arm 400 to unloading configuration 30 (see FIG. 10), for which load arm 400 is disposed at an angle of −30 degrees with respect to longitudinal axis L and locking mechanism 300 is disposed in second tube channel 230. The user can then unload one or more loads (e.g., bicycles) from platform 420 of load arm 400. The user can then rotate load arm 400 to storage configuration 40 (see FIG. 11) and engage locking mechanism 300 disposed in third tube aperture 224.

It is to be appreciated that the Detailed Description section, and not the Brief Summary and Abstract sections, is intended to be used to interpret the claims. The Summary and Abstract sections may set forth one or more but not all exemplary embodiments of load carriers and locking mechanisms as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A vehicle mounted load carrier, comprising:
a base comprising:
a stinger configured to couple to a hitch receiver of a vehicle,
a tube defining an interior surface, and a first tube aperture extending radially through the tube, and
a hub disposed at least partially within the interior surface of the tube, the hub comprising:
a first hub aperture extending radially within the hub, and
a locking mechanism configured to lock a relative rotation between the hub and the tube; and
a load arm coupled to the hub.

2. The vehicle mounted load carrier of claim 1, wherein the locking mechanism extends through the first hub aperture and the first tube aperture in a first locked configuration.

3. The vehicle mounted load carrier of claim 2, wherein the tube further comprises a second tube aperture extending radially through the tube, wherein the locking mechanism extends through the second tube aperture in a second locked configuration.

4. The vehicle mounted load carrier of claim 3, wherein the tube further comprises a third tube aperture, wherein the locking mechanism extends through the first tube aperture and the third tube aperture in the first locked configuration.

5. The vehicle mounted load carrier of claim 4, wherein the third tube aperture is disposed opposite the first aperture.

6. The vehicle mounted load carrier of claim 1, wherein the locking mechanism contacts the interior surface of the tube during rotation of the hub in an unlocked configuration.

7. The vehicle mounted load carrier of claim 1, wherein the locking mechanism comprises a plate.

8. The vehicle mounted load carrier of claim 1, wherein the locking mechanism is spring-loaded and biased to extend through the first tube aperture and the first hub aperture.

9. The vehicle mounted load carrier of claim 1, wherein the hub comprises a plurality of splines disposed along an exterior surface of the hub.

10. The vehicle mounted load carrier of claim 9, wherein a first aperture in a proximal end of the load arm is splined and configured to couple around the exterior surface of the hub.

11. The vehicle mounted load carrier of claim 10, wherein a second aperture in the proximal end of the load arm is splined and configured to couple around the exterior surface of the hub.

12. The vehicle mounted load carrier of claim 1, further comprising a bushing disposed radially between the tube and the hub.

13. The vehicle mounted load carrier of claim 1, wherein the load arm is a platform configured to carry one or more bicycles.

14. A vehicle mounted load carrier, comprising:
a base, comprising:
a tube defining an interior surface,
a first tube aperture extending through the tube, wherein the first tube aperture is configured to receive a locking mechanism, and
a second tube aperture extending through the tube, wherein the second tube aperture is configured to receive the locking mechanism;
a hub disposed in the tube; and
a load arm coupled to the hub,
wherein, in a storage configuration, the locking mechanism extends through the first tube aperture along a substantially transverse axis of the load carrier,
wherein, in a transport configuration, the locking mechanism extends through the second tube aperture along a substantially longitudinal axis of the load carrier, and
wherein in a loading configuration the locking mechanism contacts the interior surface of the tube.

15. The vehicle mounted load carrier of claim 14, wherein the hub is configured to rotate within the tube.

16. The vehicle mounted load carrier of claim 14, wherein the locking mechanism is spring-loaded and biased to extend through the first tube aperture in the storage configuration and the second tube aperture in the transport configuration.

17. The vehicle mounted load carrier of claim 14, wherein the tube comprises a tube channel extending through the tube and disposed between the first and second tube apertures.

18. The vehicle mounted load carrier of claim 17, wherein the locking mechanism comprises a recessed central section configured to translate along the tube channel.

19. A method of operating a vehicle mounted load carrier, comprising:
disengaging a locking mechanism disposed in a first aperture of a tube of a base portion of the vehicle mounted load carrier;
rotating a load arm in a first direction; and
engaging the locking mechanism through a second aperture of the tube,
wherein engaging the locking mechanism comprises spring-biasing the locking mechanism through the second aperture.

20. The method of claim 19, wherein rotating the load arm in the first direction moves a platform configured to carry one or more bicycles from a storage position to a loading position.

21. The method of claim 19, wherein disengaging the locking mechanism comprises translating the locking mechanism in a direction substantially parallel to a lengthwise direction of the load arm.

* * * * *